(No Model.)
I. W. CONSELYEA.
PROPELLING MECHANISM FOR BICYCLES.
No. 602,230. Patented Apr. 12, 1898.
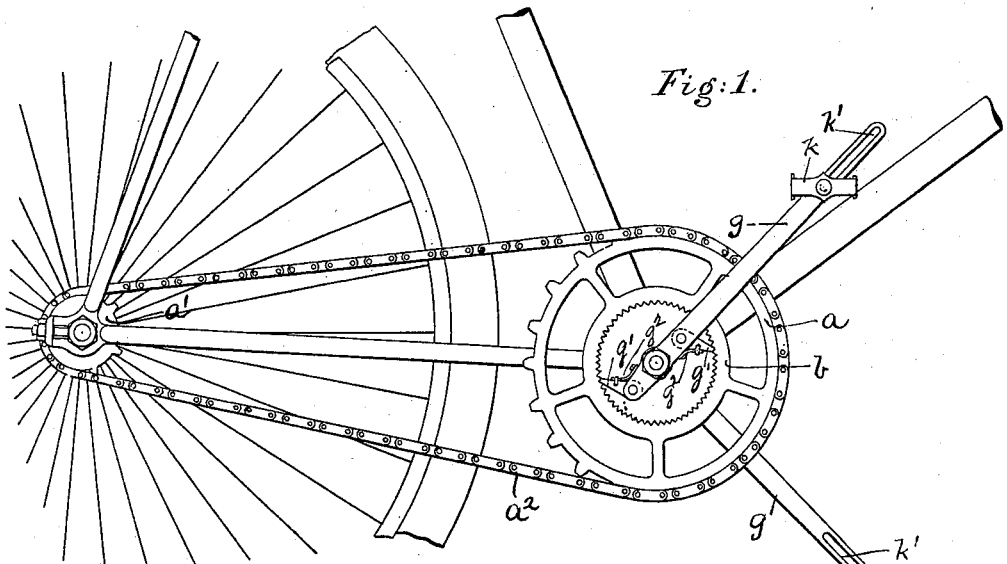
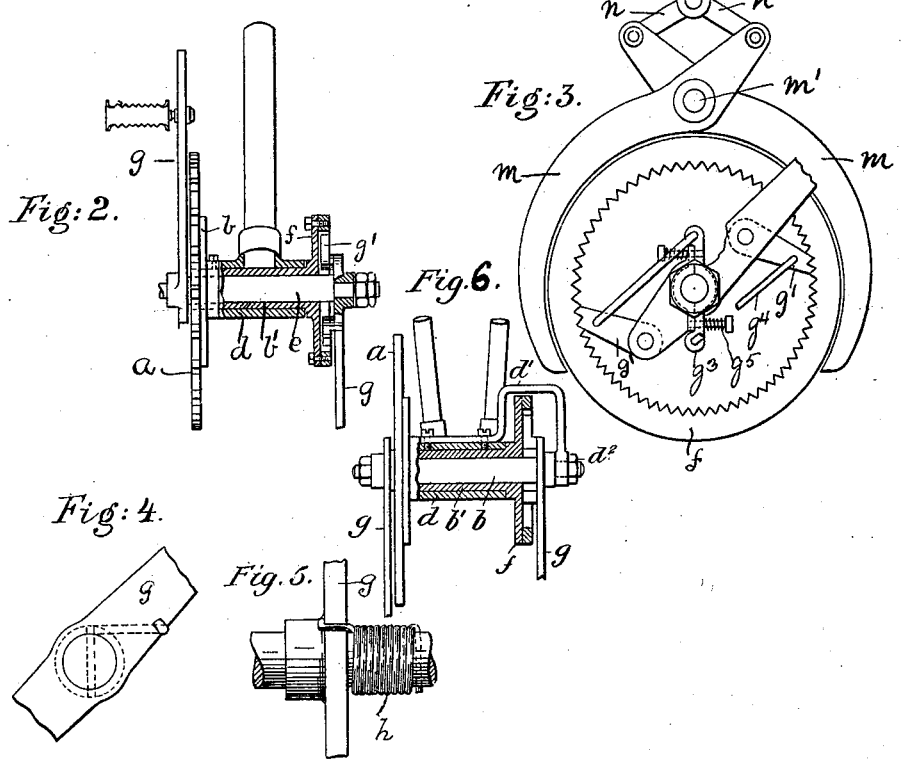
WITNESSES:
INVENTOR:
Ira W. Conselyea,
by Henry E. Ernding,
his Attorney.

UNITED STATES PATENT OFFICE.

IRA W. CONSELYEA, OF NEWARK, NEW JERSEY.

PROPELLING MECHANISM FOR BICYCLES.

SPECIFICATION forming part of Letters Patent No. 602,230, dated April 12, 1898.

Application filed August 5, 1896. Serial No. 601,712. (No model.)

*To all whom it may concern:*

Be it known that I, IRA W. CONSELYEA, a citizen of the United States, residing at Newark, in the county of Essex and State of New Jersey, have invented certain new and useful Improvements in Propelling Mechanism for Bicycles and the Like, of which the following is a specification.

My invention has relation to a propelling mechanism for bicycles, velocipedes, and similar vehicles, and in such connection it relates particularly to the construction and arrangement of such mechanism.

The principal objects of my invention are, first, to provide in a bicycle or similar vehicle a driving mechanism consisting, essentially, of a driving-sprocket, a ratcheted disk secured to said sprocket, a treadle-arm adapted to drive said disk, and a fixed pin or shaft carried by the hanger of the vehicle, said treadle-lever adapted to oscillate on said fixed shaft, and, second, to provide in a bicycle or similar vehicle a driving mechanism consisting of a driving-sprocket, a disk secured thereto, a second disk, a sleeve securing said disks together, a pin or shaft fixed in the hanger and forming a bearing upon which said sleeve rotates, two treadle-arms, each oscillating upon said fixed shaft, a pawl mechanism carried by each treadle-arm and adapted to rotate said disks, and springs fixed at one end to said pin or shaft and adapted to elevate each treadle-arm.

My invention, stated in general terms, consists of a propelling mechanism for bicycles and the like when constructed and arranged in substantially the manner hereinafter described and claimed.

The nature and scope of my invention will be more fully understood from the following description, taken in connection with the accompanying drawings, forming part hereof, and in which—

Figure 1 is a side elevational view illustrating in detail the propelling mechanism embodying main features of my invention. Fig. 2 is a front elevational view, partly sectional, of the hanger, the sprocket, and the propelling mechanism therefor. Fig. 3 is a side elevational view, enlarged, of the ratchet-disk operated by the treadle on the side opposite to that on which the sprocket is placed and illustrating a modified form of pawl mechanism and a preferred form of brake for the vehicle. Fig. 4 is a side elevational view, enlarged, of a portion of one of the treadle-levers and of a spring for raising the same after the downstroke is completed. Fig. 5 is a front elevational view of Fig. 4; and Fig. 6 is an underneath plan view, partly sectioned and viewed from the rear, of the hanger, the sprockets, propelling mechanism, and the means for fixing the shaft or bearing of the propelling mechanism to the hanger.

Referring to the drawings, $a$ represents the driving-sprocket, $a'$ the driven sprocket, and $a^2$ the chain, of a bicycle. The driving-sprocket $a$ is secured to and rotates with a ratcheted disk $b$, which in turn is fixed to a sleeve $b'$, rotating within the hanger $d$ and upon a fixed pin or shaft $e$, substantially as shown in Fig. 2. This shaft $e$ is preferably secured to the hanger $d$ by a strap $d'$, one end of which is secured to the hanger, and the other end is secured to the end of the shaft $e$ by a jam-nut $d^2$, as clearly shown in Fig. 6. The sleeve $b'$ extends through the crank-hanger $d$ and is secured to or made integral with a second ratcheted disk $f$. Upon the fixed shaft $e$, at either end thereof, is loosely secured one end of a treadle arm or lever $g$. As illustrated in Figs. 1, 2, and 3, this arm rotates upon the fixed shaft $e$ outside of the ratcheted disks, and in Fig. 6 on the inside of said disks, either position being equally advantageous. Each treadle-lever $g$ carries one or more pawls $g'$, which are pivoted to the lever $g$ and thrown against or into engagement with the teeth of the ratcheted disks $b$ or $f$. In Fig. 1 the pawls $g'$ are held normally to position by means of flat leaf-springs $g^2$, whereas in Fig. 3 they are held by means of a yoke $g^3$, a link $g^4$, and a spiral spring and pin $g^5$. In either case the pawls $g'$ are thrown into locking engagement with the teeth of the disks upon the downstroke only of each treadle-arm and slide over the teeth upon the upstroke of said arm. Each treadle-arm after it is pushed down by the foot of the rider may be returned to elevated normal position, as shown in Figs. 4 and 5, by means of a spiral spring $h$, one end of which is secured to the fixed shaft $e$, and after being coiled around said shaft the other end is placed under the treadle-arm.

In Fig. 3 I have illustrated a form of brake mechanism to be applied to the periphery of the ratcheted disk $f$. Briefly stated, it consists of two tong-like arms $m$ $m$, pivoted, as at $m'$, and adapted to be operated by the links $n$ $n$ and brake-rod $o$. The arms $m$ encircle the periphery of the disk $f$.

Having thus described the nature and objects of my invention, what I claim as new, and desire to secure by Letters Patent, is—

In a bicycle or similar vehicle, a driving mechanism consisting of a driving-sprocket, a ratcheted disk secured thereto, a second disk, a sleeve securing said disks together, a hanger, a pin or shaft fixed to said hanger and forming a bearing for said sleeve, two treadle-arms, each oscillating upon said fixed shaft, a pawl mechanism connecting each treadle-arm with one of said disks, and two springs each fixed at one end to the pin or shaft and adapted to elevate each treadle-arm, substantially as described.

IRA W. CONSELYEA.

Witnesses:
I. L. MILLER,
H. E. EVERDING.